Nov. 6, 1934.  L. E. WILT  1,980,127
RUBBER HEEL AND REENFORCING AND NAIL RETAINING MEMBER THEREFOR
Filed June 13, 1933   2 Sheets-Sheet 2
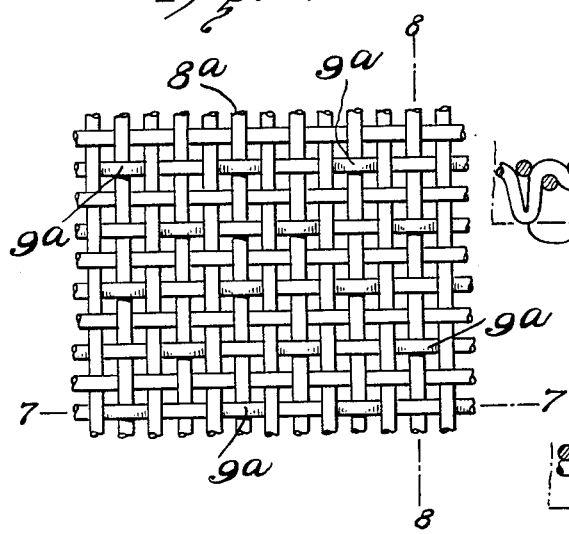
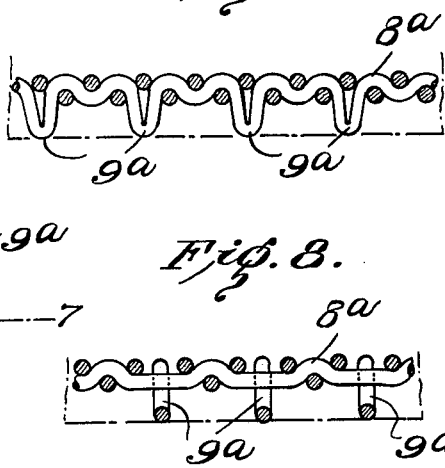
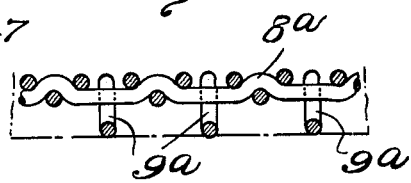
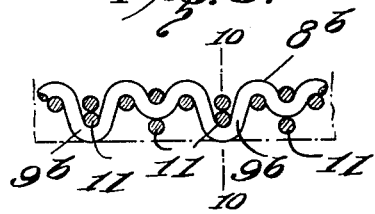
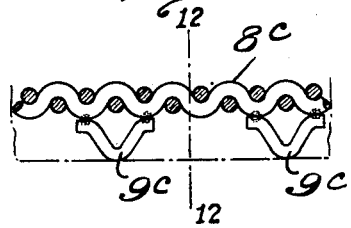
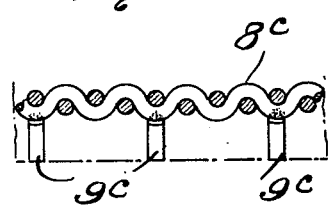
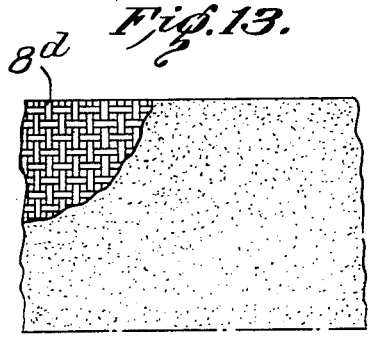
Inventor:-
Lewis E. Wilt,
By Smith, Michael & Gardiner,
Attorneys.

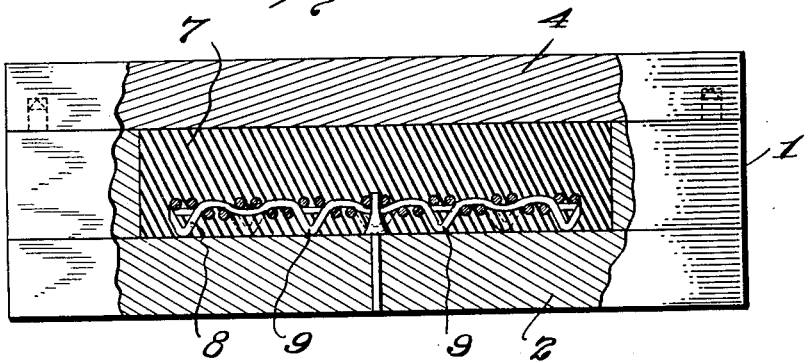
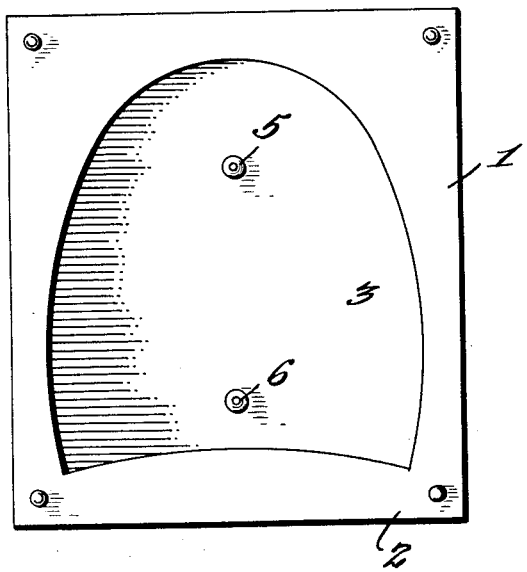
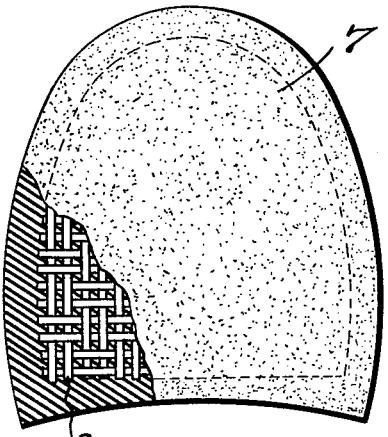
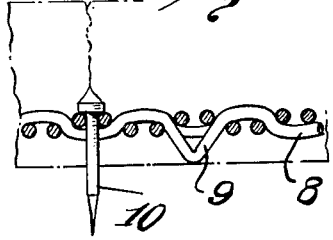
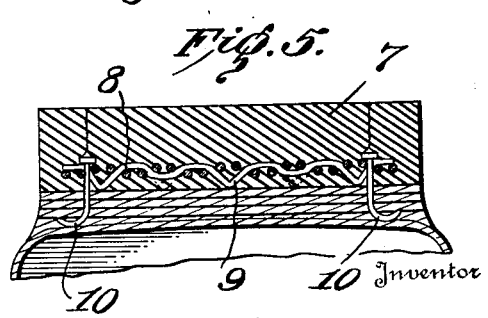

Patented Nov. 6, 1934

1,980,127

UNITED STATES PATENT OFFICE 1,980,127

RUBBER HEEL AND REENFORCING AND NAIL RETAINING MEMBER THEREFOR

Lewis E. Wilt, Akron, Ohio

Application June 13, 1933, Serial No. 675,606

12 Claims. (Cl. 36—35)

My invention relates to molded articles, sheets or the like, and has particular reference to an improved rubber heel construction having a novel reenforcing and nail-retaining member embedded therein. While I have elected to illustrate and describe my invention as applied particularly to rubber heels, it is to be understood that the same is not limited to this particular article, but that my invention may be applied to the manufacture of other articles and/or sheet materials, in any and all cases where it is desired to incorporate a reenforcing and nail-retaining member in the article or sheet.

It is a common expedient in the art relating to the manufacture of molded articles or sheets of rubber or the like, to incorporate within the said article or sheet during the process of manufacture, a reenforcing and nail-retaining member, through which the shank of a nail, screw or other fastening means may be driven when it is desired to secure the article or sheet to another article or support. In using articles or sheets of the above mentioned character, the nails or other fastening means are driven or otherwise forced through the body of the article or sheet until the head of the fastening means contacts or overlies the upper or outer surface of the reenforcing and nail-retaining member, thus securely holding the article to its support. In the art relating specifically to rubber heels, it is customary to employ relatively small, perforated metallic washers which are embedded within the heel at spaced intervals therein, the nails or other fastening means passing through the said washers to secure the rubber heel to the heel of a shoe. In the manufacture of such heels, each washer must be accurately placed upon an individual support or pin within the mold cavity prior to the molding operation, thus making the process a rather tedious and time-consuming one. Further, when an article such as a rubber heel, is made with a plurality of these washers embedded therein, the nails or other fastening means must be placed and driven with extreme care in order to insure that they will pass through the washers. This is not a difficult operation when the heel is provided with openings which extend from the washers to the tread surface of the heel and the heel is attached by hand-driven fastenings, but the location of the washers must be uniformly accurate in order to permit the use of power nailing machines, the driving and setting portions of which are disposed in definite, predetermined positions, i. e., there must be a definite relationship between the location of the washers within the heel and the location of the driving and setting portions of the machine. All of the above mentioned points with relation to the use of the usual nail-retaining washers, necessitates the employment of skilled labor, accurate and complicated machinery and frequent adjustment of the molding, driving and setting mechanisms, with consequent expense and a slowing up of manufacture. Further, rubber heels having metallic washers embedded therein are generally provided with holes or passages which extend inwardly from one surface of the heel to a point above the opening in the embedded washer, these exposed holes being objectionable because of the tendency for dust and dirt to accumulate within them after the heel is attached to the shoe.

It is an object of my invention to provide a rubber heel or the like, having a novel reenforcing and nail-retaining member embedded therein, by means of which the same may be rigidly and securely attached to a shoe or other support by nails or other fastening means.

It is an object of my invention to provide a novel reenforcing and nail-retaining member for molded rubber heels or the like, having means for spacing the said member from the bottom of the mold cavity during the molding of the heel or other article.

It is an object of my invention to provide a perforated or reticulate reenforcing and nail-retaining member for rubber heels or the like, said member having a plurality of spaced projections extending from one surface thereof to support the member in proper spaced relation to the bottom of the mold cavity during the molding of the heel or other article, said projections being either formed integrally with the reenforcing and nail-retaining member or being welded or otherwise attached to the surface thereof.

It is a further object of my invention to provide a rubber heel or the like, having a reenforcing and nail-retaining member embedded therein, and to so construct the said reenforcing and nail-retaining member as to insure its proper position and spacing within the mold cavity during the molding operation.

It is a still further object of my invention to provide a reenforcing and nail-retaining plate for rubber heels and the like, that is simple in construction, cheap and easy to manufacture, strong and durable, and highly efficient in the purposes for which designed.

Referring to the accompanying drawings forming a part of the specification and wherein I have shown several prefered embodiments of my invention, Figure 1 is a side elevation, partly in section, of a mold showing my improved heel with reenforcing and nail-retaining member embedded therein, Fig. 2 is a plan view of the lower section of the mold illustrated in Fig. 1, Fig. 3 is a plan view, partly in section, of a rubber heel made in accordance with my invention, Fig. 4 is a fragmentary side elevation of a woven reenforcing and nail-retaining member showing an attaching nail passing through the interstices of the member, Fig. 5 is a vertical sectional view of my improved heel and a portion of a shoe to which it is attached, Fig. 6 is a bottom view of a woven reenforcing and nail-retaining member, certain strands of which are bent to provide spaced supporting portions, Figs. 7 and 8 are sectional views on the lines 7—7 and 8—8, respectively, of Fig. 6, Fig. 9 is a transverse sectional view of a modified form of woven reenforcing and nail-retaining member, Fig. 10 is a sectional view on the line 10—10 of Fig. 9, Fig. 11 is a transverse sectional view of a modified form of a woven reenforcing and nail-retaining member, showing spaced supporting projections welded thereto, Fig. 12 is a sectional view on the line 12—12 of Fig. 11, and, Fig. 13 is a fragmentary view partly in section, showing my invention applied to sheet material of rubber or the like.

In the drawings, wherein like reference characters have been used to designate like parts throughout the several views, the numeral 1 designates a mold of any preferred construction suitable for the molding of rubber heels or the like, said mold including a base 2, mold cavity 3 shaped in accordance with the article to be molded, and a removable cover plate 4. Extending upwardly from the base 2, are spaced centering pins 5 and 6 which extend into the mold cavity 3, for a purpose to be hereinafter described. It is to be understood that this form of mold is old and well known in the art and forms no part of my present invention, having been selected from many different and conventional types of molding apparatus to illustrate my improved method and to make my invention readily understandable.

Referring to the heel shown in Figs. 1, 3 and 5 of the accompanying drawings, it is to be noted that the same comprises a body 7 preferably of rubber or similar moldable material having a woven, open mesh, reenforcing and nail-retaining fabric 8 embedded therein, the interstices of this fabric being of such a size or "mesh" that when the shank of a nail, brad or other fastening means is driven through the interstices, the adjacent strands of the fabric will grip the shank on all four sides and will underlie the head of said fastening means, i. e., the interstices of the fabric are of a size slightly greater than the diameter of the shank of the conventional heel-retaining nail or brad but less than the diameter of the head portion of such nail or brad. Certain of the strands, either weft or warp, of the woven fabric 8 are bent or otherwise formed to provide a plurality of spaced projections or support bends 9, which project from the face of the reenforcing and nail-retaining fabric 8 and terminate at one surface of the heel, preferably at that surface which is to lie adjacent the leather heel lift of a shoe when the heel is secured in place, as shown in Fig. 5. The fabric member 8 is cut to conform with the general shape of the heel and has its marginal edges slightly spaced inwardly from the sides of the heel as shown in the accompanying drawings.

When it is desired to attach the heel to a shoe, nails or other suitable fastening means 10 are driven into the heel by hand or machine, so that the shanks of the nails pass between the interstices of the woven, open meshed fabric 8. By means of a suitable nail set or similar tool, the nails are forced through the body of the heel overlying the fabric 8 until the heads of said nails engage the embedded weft and warp strands of the fabric 8. Since the fabric 8 is loosely woven of strands of wire or other material sufficiently strong and durable to withstand the strains and stresses incident to the normal use of rubber heels or the like, it will be readily apparent that by the use of my improved reenforcing and nail-retaining member, the heel will be rigidly secured to the shoe, due to the fact that the shanks of the fastening means 10 are each supported at four sides and the nail heads have ample bearing surface on adjacent strands of the fabric. It will be obvious that the fastening means 10 may be driven through the heel at any and all points within the margin of the reenforcing and nail-retaining fabric 8 which area is substantially co-extensive with the surface area of the heel. When the fastening nails 10 are driven into the heel and their heads forced through the body of the heel to a position contacting or overlying the fabric 8, the rubber will, of course, be perforated by the passage of the nail head and nail set therethrough, but when the set is removed, the rubber, because of its inherent characteristics, will close the hole or opening and leave the tread surface substantially intact. Due to the spaced, relatively loose weave of the reenforcing and nail-retaining member 8, the strands of the fabric may partake of slight lateral movement to permit the nails to be driven straight into the heel, i. e., the strands may shift slightly to permit the nails to enter the interstices between the woven strands of the fabric. The tread surface of the heel may be roughened, ornamented or otherwise formed to suit the requirements of the manufacturer or trade.

Referring to the reenforcing and nail-retaining member 8 of my present invention, it is to be noted that in Figs. 1, 3, 4 and 5, I have shown a preferred embodiment, in which the member consists of a loosely woven, open mesh fabric of "twin" or double weft and warp strands, these strands being of a material sufficiently strong and durable to withstand the strains and stresses incident to the pressure molding operation and condition of use of the heel or other article or sheet. Preferably the member or fabric 8 is woven of round, metallic wires or strands, and the interstices between the strands are of a size slightly greater than the diameter of the shank of an ordinary heel—attaching nail or brad, but less than the diameter of the head of such nail or brad, so that the adjacent strands of the fabric will grip the shank on all four sides and will underlie the head of the nail or brad when said nail or brad is driven through the fabric. Certain of the strands of the fabric, either weft or warp, are bent or otherwise formed to provide a plurality of spaced, downwardly extending, substantially U-shaped projections or support bends, 9, these projections all extending from one side of the fabric and being of a sufficient length or height to position the body of the fabric in proper spaced relation from the bottom of the heel when molded, or from the bottom of the mold cavity during the molding operation. Obviously, the length or height of the projection 9 is dependent upon the thickness of the completed heel and the desired position of the reenforcing and nail-retaining member 8 within the heel. Due to the material of which the fabric 8 is woven, the plurality of spaced projections or support bends 9, are sufficiently strong to withstand the normal crushing effect occasioned by the pressure molding operation, i. e., the projections or support bends 9 will retain the body of the fabric 8 in proper spaced, parallel relation from the bottom of the mold cavity and will permit the rubber or other moldable material to be forced around and through the fabric 8 without the projections or support bends crushing or collapsing.

Referring to the modification shown in Figs. 6, 7 and 8 of the accompanying drawings, it is to be noted that in this form of my invention, the reenforcing and nail-retaining member 8$^a$ comprises a loosely woven, open mesh fabric of single weft and warp strands of round, metallic wire or similar strong and durable strand material, the interstices between the strands being of a size slightly greater than the diameter of the shank of an ordinary heel-attaching nail or brad, but less than the diameter of the head of such nail or brad, so that the adjacent strands of the fabric will grip the strand on all four sides and will underlie the head of the nail or brad when said nail or brad is driven through the fabric. Certain of the strands of the fabric, either weft or warp, are bent or otherwise formed to provide a plurality of spaced, downwardly-extending, substantially U-shaped projections or support bends 9$^a$, these projections all extending from one side of the fabric and being of a sufficient length or height to position the body of the fabric in proper spaced parallel relation from the bottom of the heel when molded, or from the bottom of the mold cavity during the molding operation. These projections or support bends 9$^a$, like the corresponding portions 9 of the preferred embodiment of my invention above described, are sufficiently strong to withstand the pressure incident to the molding operation without crushing or collapsing.

Referring to the modification shown in Figs. 9 and 10 of the accompanying drawings, it will be noted that in this form of my invention, the reenforcing and nail-retaining member 8$^b$ corresponds to the disclosure of Figs. 6, 7 and 8, except that in this construction, extra weft or warp strands 11 have been incorporated in the fabric 8$^b$ during the weaving of the said fabric. Alternate strands 11 are disposed within the projections or support bends 9$^b$ and act as stiffeners for the said projections or support bends. This form of woven fabric reenforcement and nail-retaining member 8$^b$ finds particular application in molding operations where a relatively heavy or stiff rubber or plastic moldable material is used, as the stiffening strands 11 positively prevent the crushing or collapsing of the spaced projections or support bends 9$^b$ under the heavy molding pressure, and permit the moldable material to be forced through and around the fabric reenforcing and nail-retaining member to completely fill the mold cavity.

Referring to the modification shown in Figs. 11 and 12 of the accompanying drawings, it is to be noted that in this form of my invention I have disclosed a loosely woven, open meshed fabric 8$^c$ of single weft and warp strands, in which the projections or support bends 9$^c$ are separately stamped or otherwise formed and are attached at spaced intervals throughout the bottom surface of the fabric, by soldering, welding or the like. Obviously the separately-made projections or support bends 9$^c$ may be used in connection with other forms of loosely woven, open-mesh fabric, such, for example, the fabric shown in Figs. 1 and 3 to 10 inclusive of the accompanying drawings.

In Fig. 13 I have shown a fragmentary view, partly in section, of my invention as applied to sheet material of molded rubber or the like, in order to emphasize the fact that the reenforcing and nail-retaining plate 8$^d$, which may take the form of any of the several modifications above described, is not limited to use in connection with rubber heels, but that the invention is equally applicable to the manufacture of other molded articles or sheet materials, wherein it is desired to incorporate a reinforcing and nail-retaining member in the article or sheet.

I desire to point out that the reenforcing and nail-retaining member 8, or any of its modifications 8$^a$, 8$^b$ or 8$^c$ above described, may be placed within the mold cavity 3 with the projections or support bends contacting with the bottom of the mold cavity. When placing the reenforcing and nail-retaining member within the mold cavity 3, the said member is positioned within the approximate center of the mold cavity and is retained in this centralized position by engagement of the centering pins 5 and 6 within the interstices of the member, it being noted, however, that these pins 5 and 6 serve as centering pins, and in no way determine the distance of the reenforcing and nail-retaining member from the bottom of the mold cavity 3, this latter function being performed entirely by the plurality of projections or support bends extending from the lower face of the member. The rubber or other plastic moldable material is then flowed into the mold cavity 3 and the cover plate 4 forced into position to close the mold, the rubber or other material being forced around and through the reenforcing and nail-retaining member to completely fill the mold cavity. During this molding operation, the projections or support bends maintain the reenforcing and nail-retaining member in proper spaced, parallel relation to the bottom of the mold cavity and insure that the said member is properly positioned with respect to the body of moldable material, these projections or support bends, constructed in any of the several forms illustrated, being sufficiently strong and rigid to prevent their crushing or collapse under the high molding pressures usually employed in the molding of rubber or the like. Upon the completion of the molding operation the heel or other article is ready for subsequent vulcanization or other treatment.

It will thus be seen that I have provided an improved rubber heel or similar article or sheet, having a novel reenforcing and nail-retaining member embedded therein, by means of which the heel, article or sheet may be rigidly and securely attached to a shoe or other support by nails or other fastening means, which can be driven or forced through the heel or the like, by hand or by machine, at any point or points throughout substantially its entire surface, and that I have provided a reenforcing and nail-retaining member for rubber heels or the like provided with a plurality of projections or supports which serve to properly position the member within the mold cavity during the molding operation.

It is to be understood that the forms of my invention herein shown and described are to be taken as preferred embodiments and that various changes may be made in the size, shape, arrangements of parts, without departing from the spirit of my invention or the scope of the subjoined claims. For example, I have elected to disclose my reenforcing and nail-retaining member as composed of a woven, open mesh fabric of wire or similar strands, but it is well within the scope of my invention to employ, instead of the reticulate woven fabric, a perforated plate having integral projections or support bends struck from its surface or such a plate having projections or support bends, attached to one surface by soldering, welding or the like. Other changes or modifications of the invention will be readily apparent to those skilled in the art.

Having thus described my invention, I claim:—

1. A molded rubber heel having a woven reenforcing and nail-retaining member embedded therein, said member having rigid, pre-formed projections extending to an outer surface of the heel.

2. A molded rubber heel having a woven reenforcing and nail-retaining member embedded therein, said member having pre-formed projections extending to an outer surface of the heel and including means for stiffening said projections.

3. A molded rubber heel having a woven reenforcing and nail-retaining member embedded therein, said member having rigid integral projections extending to an outer surface of the heel.

4. A molded rubber heel having a woven reenforcing and nail-retaining member embedded therein, certain strands of said woven member having spaced, rigid support bends formed therein, which extend to an outer surface of the heel.

5. A molded article or sheet having a woven reenforcing and nail-retaining member embedded therein, said woven member comprising double warp and weft strands, certain of said strands having rigid support bends formed therein which extend to an outer surface of the article or sheet.

6. A molded article or sheet having a woven reenforcing and nail-retaining member embedded therein, certain strands of said woven member having rigid support bends formed therein which extend to an outer surface of the article or sheet, and extra strands disposed within said support bends to stiffen the same.

7. A molded article or sheet having a woven metallic reenforcing and nail-retaining member embedded therein, said member having projections welded to a surface thereof and extending to an outer surface of the article or sheet.

8. A reenforcing and nail-retaining member for molded articles or sheets comprising a woven fabric having rigid projections extending from one surface thereof said projections adapted to support the member in spaced relation from the bottom of a mold cavity during the molding operation.

9. A reenforcing and nail-retaining member for molded articles or sheets comprising a woven fabric having projections extending from one surface thereof, said projections adapted to support the member in spaced relation from the bottom of a mold cavity during the molding operation, said member including means for stiffening said support bends.

10. A reenforcing and nail-retaining member for molded articles or sheets comprising a woven fabric having rigid integral projections extending from one surface thereof, said projections adapted to support the member in spaced relation from the bottom of a mold cavity during the molding operation.

11. A woven reenforcing and nail-retaining member for molded articles or sheets, certain strands of which have spaced support bends formed therein adapted to support the member in spaced relation from the bottom of a mold cavity during the molding operation, said woven member including extra strands disposed within said support bends to stiffen the same.

12. A metallic reenforcing and nail-retaining member for molded articles or sheets comprising a woven fabric having projections welded to a surface thereof, said projections adapted to support the member in spaced relation from the bottom of a mold cavity during the molding operation.

LEWIS E. WILT.